US006926979B2

United States Patent
Cao

(10) Patent No.: US 6,926,979 B2
(45) Date of Patent: Aug. 9, 2005

(54) WASTE HEAT RECOVERY MEANS FOR FUEL CELL POWER SYSTEM

(76) Inventor: Yiding Cao, 16302 SW. 68 Ter., Miami, FL (US) 33193

( * ) Notice: Subject to any disclaimer, the term of this patent is extended or adjusted under 35 U.S.C. 154(b) by 452 days.

(21) Appl. No.: 10/270,868

(22) Filed: Oct. 15, 2002

(65) Prior Publication Data

US 2003/0077497 A1 Apr. 24, 2003

Related U.S. Application Data

(60) Provisional application No. 60/329,858, filed on Oct. 18, 2001.

(51) Int. Cl.[7] .............................................. H01M 10/50
(52) U.S. Cl. .............................. 429/12; 429/13; 429/22
(58) Field of Search .............................. 429/12, 13, 19, 429/20, 22, 24, 26, 62, 120

(56) References Cited

U.S. PATENT DOCUMENTS

2004/0058230 A1 * 3/2004 Hsu ............................ 429/62

* cited by examiner

*Primary Examiner*—Michael Barr
*Assistant Examiner*—Monique Wills

(57) ABSTRACT

A fuel cell power system includes at least a fuel cell stack, a cooling means which removes the waste heat generated within the fuel cell stack, a fuel reformer which reforms a hydrocarbon for the fuel supply to the fuel cell stack, and an energy recovery system, which includes an expansion valve for reducing the pressure of the feedstock to the energy recovery system, a heat exchanger for facilitating the heat transfer from the cooling means of the fuel cell stack to the feedstock of the energy recovery system, and at least a compressor for raising the pressure of the feedstock to a sufficiently high level and delivering the feedstock to the fuel reformer, thereby a substantially large portion of the waste heat is recovered and used to vaporize the feedstock. As a result, the fuel utilization of the fuel cell power system is significantly improved due to a reduced heat input to the fuel reformer, and the size of the radiator and the associated power consumption for dissipating the waste heat into the surroundings is substantially reduced.

12 Claims, 3 Drawing Sheets

WASTE HEAT RECOVERY MEANS FOR FUEL CELL POWER SYSTEM

CROSS REFERENCES TO RELATED APPLICATIONS

This application is a continuation of provisional application No. 60/329,858 filed Oct. 18, 2001.

BACKGROUND OF THE INVENTION

A fuel cell is a device that directly converts the chemical energy of reactants (a fuel and an oxidant) into low-voltage d.c. electricity. Many of the operational characteristics of fuel cell systems are superior to those of conventional power generation. Among several distinct types of fuel cells, the polymer electrolyte membrane or proton exchange membrane (PEM) fuel cell is most popular for transportation and portable applications. The PEM fuel cell could employ compressed hydrogen gas or methanol reformate as fuel. Other hydrocarbons, such as gasoline, diesel fuel, or ethanol could also be reformed to produce suitable reformate for the fuel cell (U.S. Pat. No. 5,928,614 of Autenrieth and Heil, U.S. Pat. No. 4,865,624 of Okada, U.S. Pat. No. 5,984,986 of Weisheu et al., U.S. Pat. No. 5,651,800 of Mizuno et al., U.S. Pat. No. 4,909,808 of Voecks, and U.S. Pat. No. 5,484,577 of Buswell et al.). Although a fuel cell operating on pure hydrogen gas is considered to be the ultimate clean energy system, the difficulties associated with handling high-pressure compressed hydrogen gas and the lack of a hydrogen infrastructure would prevent the mass use of the fuel cell power system in the foreseeable future. As a result, fuel cell power systems using reformate from methanol or from other hydrocarbons such as gasoline are actively under development. One of the drawbacks for reformate based fuel cell power systems is that a large amount of energy is needed for the fuel processing purpose. The total heat energy requirement for a reformer can be estimated by using the following relation (U.S. Pat. No. 5,997,594 of Edlund and Pledger):

$$\Delta H_{tot} = \Delta H_{rxn} + \Delta H_{vap} + \Delta H_{cp} + \Delta H_{loss}$$

where $\Delta H_{rxn}$ is the enthalpy of reforming reaction; $\Delta H_{vap}$ is the enthalpy of vaporization of the liquid feedstock; $\Delta H_{cp}$ is the enthalpy required to heat the vaporized feedstock to the reforming temperature; and $\Delta H_{loss}$ is the heat lost to the ambient which could be minimized with adequate insulation. It was estimated that heating value equivalent to that of about 20% to 30% of the hydrogen produced in the reformer is needed to provide a fuel stream with sufficient heating value to meet the heating requirement, $\Delta H_{tot}$, of the reformer. This amount of heating value is usually provided through the combustion of remaining hydrogen/hydrocarbons in the exhaust gases from the fuel cell anode, burning the hydrogen/hydrocarbons in the byproduct stream of the reformer, or consumption of additional hydrocarbon fuel other than that being reformed in the reformer. It is evident that the energy input to the reformer must be reduced if the efficiency of a fuel cell power system is to be increased.

Another problem generally associated with a PEM fuel cell power system is the difficulty in dissipating the waste heat generated by the fuel cell stack. The voltage efficiency of a PEM fuel cell stack under normal operating condition is about 50 to 70%. This means that 30 to 50% of the energy content of the hydrogen participating in the electrochemical reaction in the fuel cell stack will be dissipated into waste heat that must be removed from the fuel cell stack under steady state operating condition. Since a PEM fuel cell normally operates within a temperature range of 60–80° C. that is substantially lower than that of an internal combustion engine, a cooling system employing conventional radiators would require much more space and fan power for adequate heat removal from the fuel cell stack. The present invention has been made to overcome these difficulties described above.

SUMMARY OF THE INVENTION

It is an objective of the present invention to provide an energy recovery system which recovers the waste heat generated by the fuel cell stack and uses it for fuel processing purposes, thereby the total thermal energy required for the fuel reformer is substantially reduced and the efficiency of a fuel cell power system employing said energy recovery system is significantly increased. The energy recovery system comprises an expansion valve, a heat exchanger that facilitates the heat transfer between the feedstock and the cooling medium of the fuel cell stack, and a compressor system. After flowing through the expansion valve, the pressure of the feedstock to the heat exchanger is reduced to a sufficiently low level, and the feedstock is vaporized in the heat exchanger while absorbing heat from the cooling medium of the fuel cell stack. At the outlet of the heat exchanger, the feedstock is substantially vaporized, and is subsequently compressed to a sufficiently high pressure by the compressor system before it is delivered to the fuel reformer, The feedstock could be water, fuel, or the mixture of water and fuel. Since the latent heat of vaporization is provided through the thermal energy recovered from the waste heat generated by the fuel cell stack, the heat input to the fuel reformer for the endothermic reaction in the reformer is substantially reduced, and subsequently the fuel efficiency of the fuel cell power system is substantially improved.

Another objective of this invention is to provide a heat dissipation means for the waste heat generated by the fuel cell stack. During the heat transfer process within the heat exchanger in the energy recovery system, a substantially large portion of the heat which is removed from the fuel cell stack is transferred to the feedstock. As a result, the fuel cell stack can be adequately cooled with a much smaller cooling device such as a radiator requiring a much smaller heat dissipation capacity and consuming much smaller power for the cooling fan. In some situation, a radiator for the heat dissipation could be completely eliminated.

DETAILED DESCRIPTION OF THE INVENTION

Figure 1:
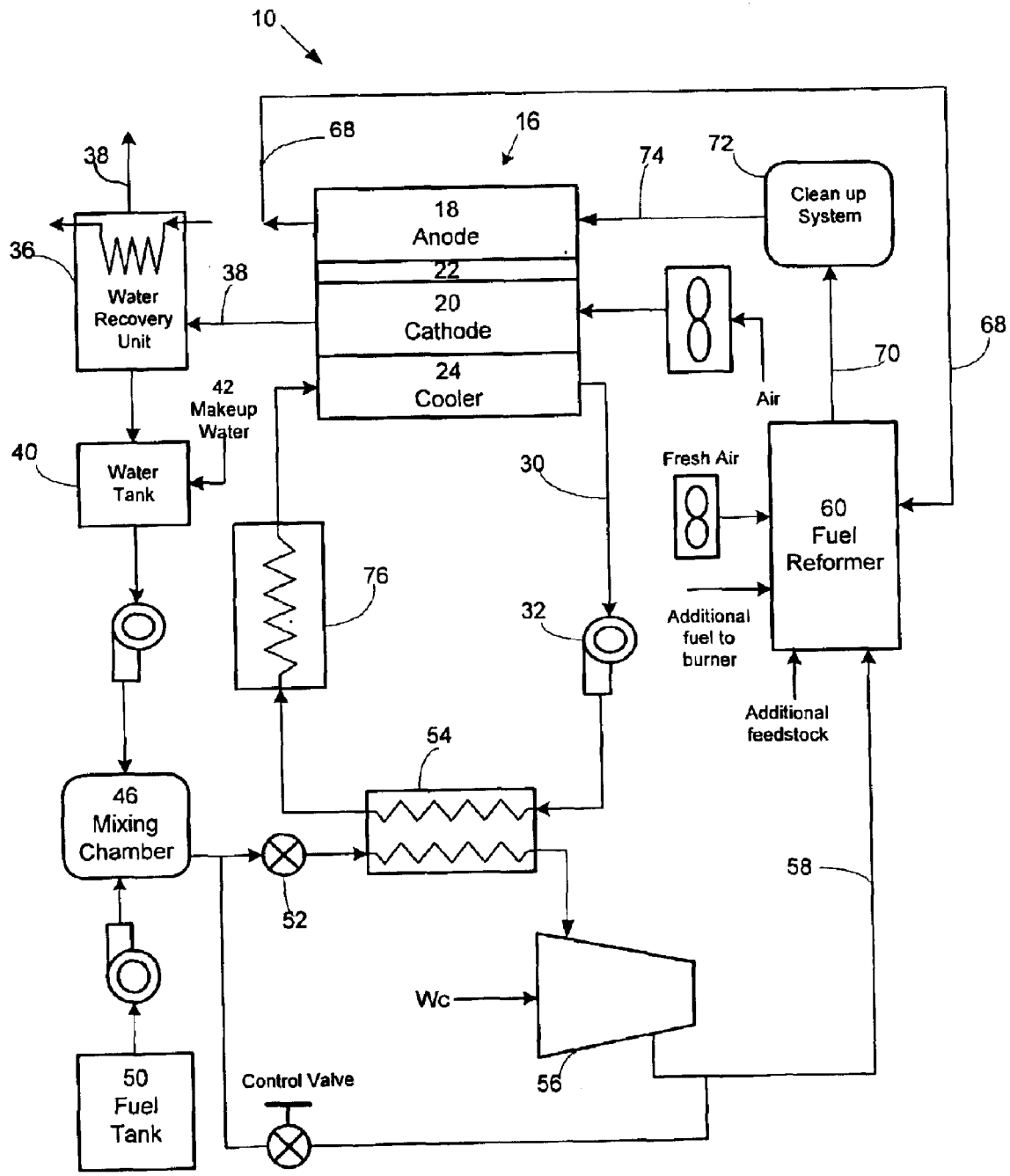
FIG. 1 is a schematic illustration of a fuel cell power system with the energy recovery system.
Figure 2:
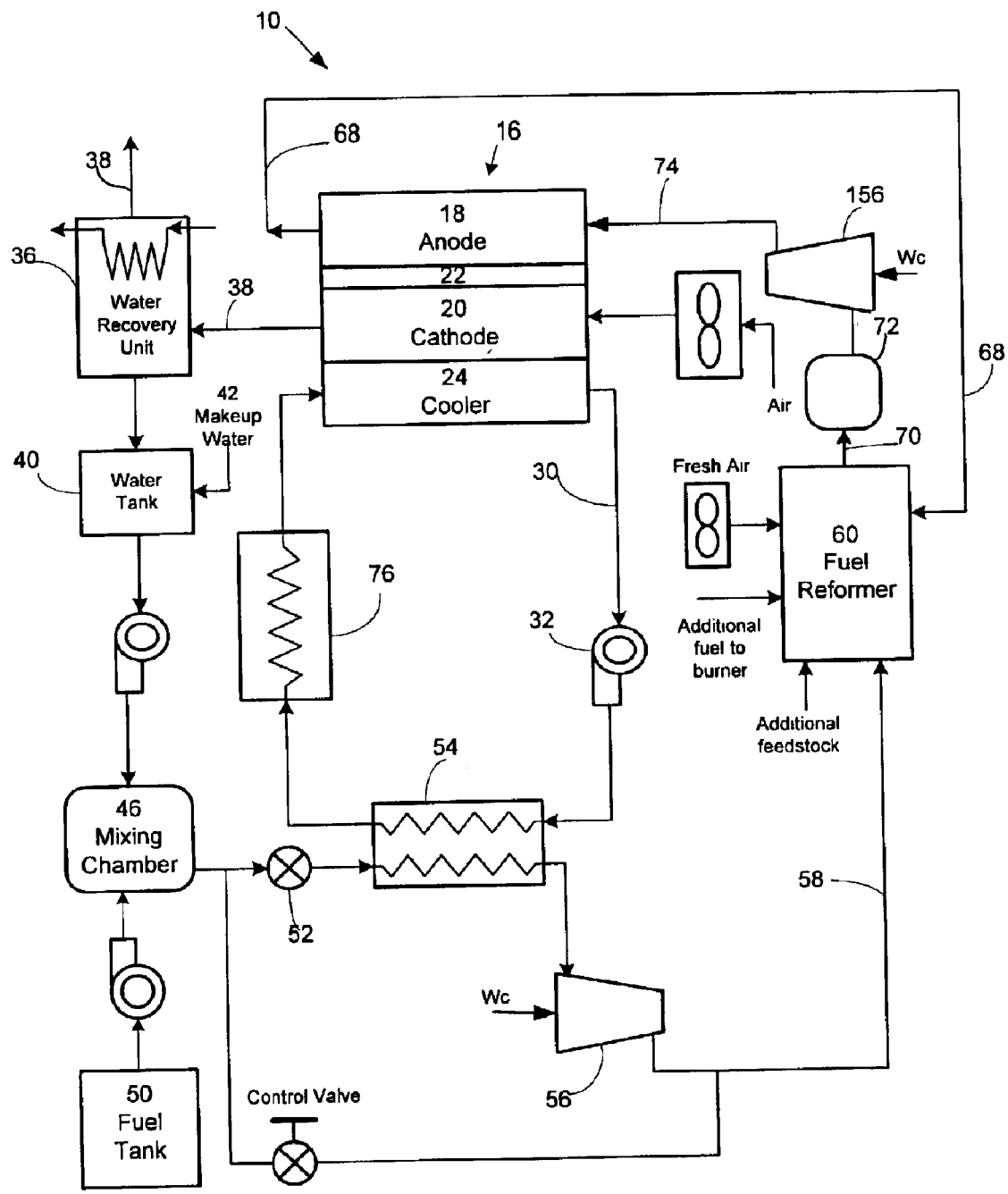
FIG. 2 is a schematic illustration of a fuel cell power system with the energy recovery system with additional compression on the discharge side of the fuel reformer.

With reference to FIG. 1, which illustrates a reformate/air fuel cell power system 10 according to a preferred form of the present invention. The fuel cell power system 10 generally comprises at least a fuel cell stack 16 which includes at least an anode electrode 18, a cathode electrode 20, an electrolyte 22 such as a proton exchange membrane (PEM) between the anode and cathode, and a cooler section 24. The cooler section 24 could be integrated with a close-looped cooling system 30 with a coolant pump 32 which circulates a liquid coolant within the loop to remove the waste heat from the fuel cell stack, as shown in FIG. 1. Alternatively, the cooler section could be integrated with a heat pipe device which removes the waste heat from the fuel cell stack through the two-phase heat transfer mechanism, or an open-looped air cooling system to remove the waste heat from the fuel cell stack (not shown). A water recovery unit 36 recovers water from the cathode exhaust air stream 38 and discharges the recovered water to a water tank 40. The water tank could also receive water from a makeup water source 42. The water is pumped into a mixing chamber 46 and is mixed with a liquid fuel pumped from a fuel tank 50 with an appropriate ratio. If the fuel is methanol, the ratio of water to methanol on a molar basis is generally greater than the stoichiometric ratio which is equal to one. After flowing through a pressure-lowering device 52, such as an expansion valve, the pressure of the water-fuel mixture is substantially reduced. The mixture with a reduced pressure enters a heat exchanger 54 and absorbs heat from the coolant circulating within the cooler loop 30. Since the pressure of the mixture is sufficiently low, it is substantially vaporized while absorbing heat from the coolant in the heat exchanger 54. The vapor mixture of water and fuel with a sufficient superheating emerges from the heat exchanger and enters a compressor 56 where its pressure is raised to a sufficiently high level. Now the water/fuel vapor mixture leaves the compressor 56 and enters a fuel reformer 60 as the vapor feedstock of the reformer. Additional thermal energy may be needed for reforming reaction in the reformer. This could be provided through a burner in the reformer that burns the hydrogen/hydrocarbons remaining in the anode exhaust stream 68 as shown in the figure. The water/fuel vapor feedstock is reformed in the reformer and the products 70 are substantially a mixture of $H_2$ and $CO_2$ with a small amount of CO for a fuel cell power system using methanol as fuel. A clean up system 72 may be needed to reduce the CO content of the products 70 to an acceptable level before the dilute hydrogen stream 74 is fed into the fuel cell stack 16 to generate electricity. Alternatively, the clean up system may be replaced with a hydrogen separation device that produces very pure hydrogen for the fuel cell stack. The advantage of the present energy recovery system is significant. The latent heat that is needed to vaporize the liquid water or liquid fuel feedstock would come from the waste heat from the fuel cell stack which could otherwise be dumped into the surroundings. Since the latent heat normally constitutes a large portion of the total reforming heat (could be more than 50%), the fuel burned in the reformer burner would be substantially reduced and the efficiency of the fuel cell power system could be significantly increased. On the other hand, since a huge amount of the waste heat from the fuel cell stack is absorbed by the feedstock of the reformer, the heat dissipation load of the heat dissipation device 76 (such as a radiator for dissipating the waste heat generated by the fuel cell stack into the surroundings) can be drastically reduced, which substantially reduces the size of the radiator and the power consumption of the cooling fan. Additionally, due to the nature of heat exchange occurring between the liquid coolant and the two-phase water/fuel mixture in the heat exchanger, the size of the heat exchanger could be very small compared to that of a radiator. During the cold start of the fuel cell power system when the waste heat is not available, the liquid feedstock could bypass the energy recovery system and directly flows (though the control valve) into the fuel reformer 60, as shown in FIG. 1. One of the critical components of the present energy recovery system is the compressor. Due to a relatively small mass flow rate, a compact and less expensive centrifugal compressor may be used. Because of the limitation of the compression ratio, however, a PEM fuel cell power system incorporating the present energy recovery system is to work preferably at a relatively low pressure compared to that of a power system without incorporating the present energy recovery system. For some fuel cell power systems that require a higher operating pressure, multistage compression with intercooling may be needed to raise the feedstock to a required pressure and reduce the operating temperature of a compressor. Alternatively, as illustrated in FIG. 2, the feedstock could be compressed to a relatively low pressure that is sufficient to overcome the flow resistance within the reformer. Additional compression could be done by a compressor 156 on the discharge side of the fuel reformer for the reformed fuel/products, which raises the pressure of the reformed fuel to the operating pressure of the fuel cell stack, as shown in FIG. 2. In this case, the temperature of the reformed fuel could be high after the compression. Some of the thermal energy contained within the reformed fuel could be recuperated as part of the heat input to the reformer, or as a heat source to vaporize part of the water feedstock or fuel feedstock to the fuel reformer (not shown).

To evaluate the performance of a fuel cell power system incorporating the energy recovery system, a proton exchange membrane (PEM) fuel cell power system using methanol as fuel is considered. Such a power system is schematically illustrated in FIG. 1. In the following evaluation, the fuel cell stack is assumed to have an electrochemical efficiency of 65% based on the higher heating value of hydrogen. It should be noted that this efficiency is for the amount of hydrogen that participates in the electrochemical reaction within the fuel cell stack. The products or the reformed fuel at the outlet of reformer is assumed to be at a temperature of 150° C. with the remaining water in a vapor condition and the CO content is ignored during the calculation of thermal energy requirement. For the reduction of CO content in the products during the steam reforming process, excess water is normally used for the steam reforming of methanol. In the present calculation, the percent theoretical water, which is defined as the actual molar water-methanol ratio divided by the stoichiometric water-methanol ratio, is taken to be 1.5. The power system efficiency herein is defined as the ratio of the net electricity produced to the higher heating value of the hydrogen consumed.

Figure 3:
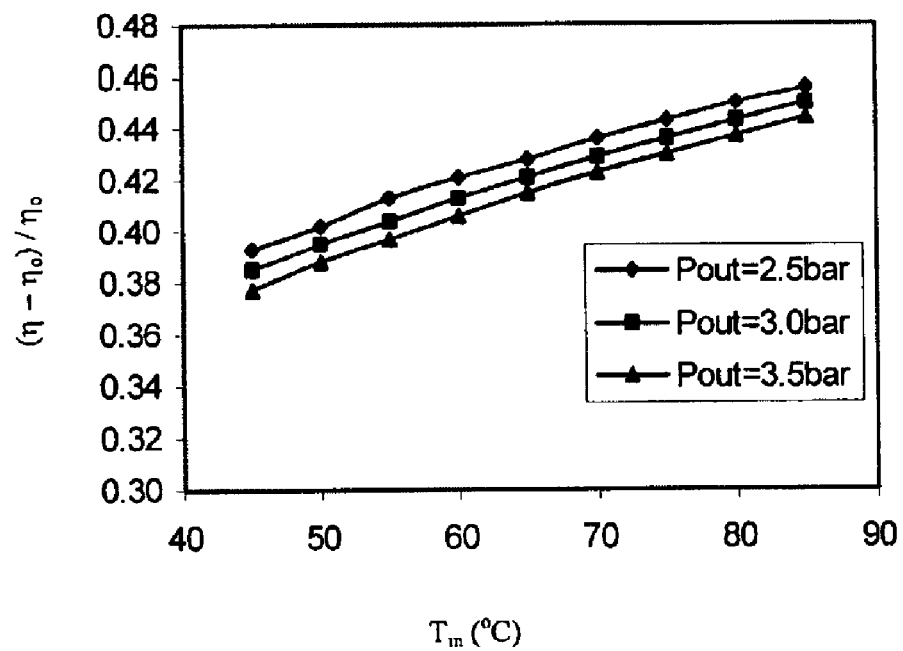
FIG. 3 is a graph illustrating the improvement in the efficiency of a fuel cell power system with the energy recovery system.
Figure 4:
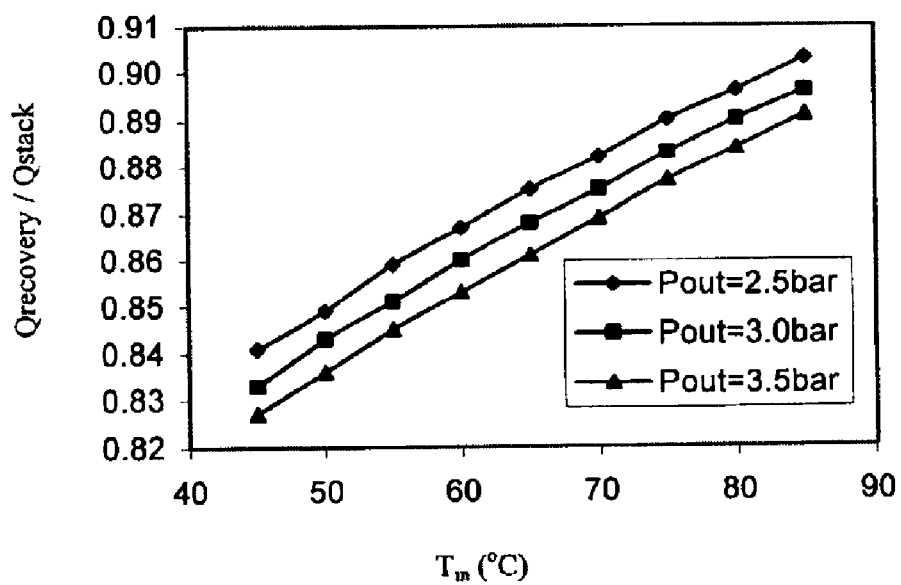
FIG. 4 is a graph illustrating the percentage of the waste heat that is recovered.

FIG. 3 illustrates the relationship between $(\eta-\eta_o)/\eta_o$ and $T_{in}$ at different $p_{out}$, where $\eta$ is the fuel cell power system efficiency incorporating the energy recovery system, $\eta_o$ is the efficiency of a base fuel cell power system without incorporating the energy recovery system, $T_{in}$ is temperature of the vapor water-methanol mixture at the inlet of the compressor, which is directly related to the operating temperature of the fuel cell stack, and $p_{out}$ is the pressure of the vapor water-methanol mixture at the outlet of the compressor, which is directly related to the operating pressure of the fuel reformer or the fuel cell stack. As can be seen from FIG. 3, in most cases, the improvement of the power system efficiency is maintained at about 40% and is basically insensitive to the change in $T_{in}$ or $p_{out}$. The results from FIG. 3 indicate that the energy recovery system could substantially improve the power system efficiency and work within a fairly large range of fuel cell stack working temperatures. It should be pointed out, however, at an even higher compression ratio, which is dictated by a smaller $T_{in}$ and a higher $p_{out}$, the compressor outlet temperature could reach a substantially high level. In this case, as mentioned earlier, a multistage with intercooling compression system may be needed. As discussed earlier, additional benefit of the present energy recovery system is the substantial reduction of the waste heat that needs to be dissipated by a heat dissipation device such as a radiator. FIG. 4 shows the ratio of the waste heat recovered by the energy recovery system to the total waste heat generated by the fuel cell stack as a function of $T_{in}$ and $p_{out}$. As can be seen from the figure, more than 90% of the waste heat could be recovered. As a result, the needed heat dissipation capacity of a radiator could be reduced by more than 90%, and the size of the radiator and the associated fan power consumption could be drastically reduced. Although the evaluation above is based on a number of assumptions and certain specific working conditions, the results should be representative for the generally performance of a fuel cell power system with the energy recovery system.

The foregoing evaluation is based upon a fuel cell power system using methanol as fuel. The energy recovery system described in this invention, however, can be employed for a fuel cell power system using other hydrocarbon fuels as well. The other fuels include gasoline, ethanol, and diesel fuel. For instance, a fuel cell power system using gasoline as fuel would involve processing gasoline utilizing partial oxidation technique with the water-gas shift to complete hydrogen production. The process still requires a large amount of water steam. The present energy recovery system can be employed to recover the waste heat from the fuel cell stack and uses it to generate water steam for the fuel reforming. The utilization and deployment of the energy recovery system are also flexible. In the fuel cell power system as described in FIG. 1, the feedstock to the heat exchanger is the liquid mixture of water and fuel. However, the feedstock could also be pure water or pure fuel depending on the specific need for the energy recovery. The liquid water and the liquid fuel could also be vaporized separately in the heat exchanger and then mixed for the steam reforming purposes. It is understandable that it is not necessary that all the thermal energy required to vaporize water or fuel feedstock to the reformer should come from the recovered waste energy from the fuel cell stack; part of the energy for the vaporization could be provided by the flue gas of the reformer burner or by cooling the reformed fuel before it is used as fuel for the fuel cell stack. In some situations, when the working temperature of the fuel cell stack is high, methanol could bypass the mixing chamber 46 and the expansion valve 52, and be vaporized separately in the heat exchanger 54. The methanol vapor could then mix with the water vapor from the heat exchanger in a mixing device (not shown). Through this arrangement, the work consumption of the compressor could be somewhat lowered. Additionally, a heat pump system such as the one using gas as the working fluid could be considered for the substitution of the present energy recovery system. However, the low coefficient of performance (COP) and a large size could make such a close-looped heat pump system impractical for the present energy recovery application.

It will thus be seen that the invention effectively attains the objectives set forth above. It is intended that all matter contained in the above specification or shown in the accompanying drawings be interpreted as illustrative and not in a limiting sense. Any changes, modifications, and variations of the subject invention will be apparent to those skilled in the art after considering this specification together with the accompanying drawings.

What is claimed is:

1. A fuel cell power system comprising:

at least a fuel cell stack, a cooling means, said cooling means removes the waste heat generated within the fuel cell stack, a fuel reformer which reforms a hydrocarbon for the fuel supply to said fuel cell stack, and an energy recovery system, said energy recovery system including a pressure-lowering device which reduces the pressure of the feedstock to the energy recovery system, a heat exchanger which facilitates the heat transfer from said cooling means of the fuel cell stack to said feedstock of the energy recovery system, and a compressor system which raises the pressure of the feedstock to a sufficiently high level and delivers the feedstock to said fuel reformer, thereby a substantially large portion of the waste heat generated by said fuel cell stack is recovered and subsequently used to vaporize said feedstock and the fuel utilization of the fuel cell power system is significantly improved due to a reduced heat input to said fuel reformer, and thereby the size of the waste heat dissipation device and the associated power consumption of said cooling means is substantially reduced.

2. The invention as described in claim 1 wherein said compressor system includes at least a compressor on the discharge side of the fuel reformer to raise the pressure of the reformed fuel flowing out of the fuel reformer.

3. The invention as described in claim 1 wherein said fuel cell stack is a proton exchange membrane (PEM) fuel cell stack.

4. The invention as described in claim 1 wherein said hydrocarbon is methanol.

5. The invention as described in claim 1 wherein said hydrocarbon is gasoline.

6. The invention as described in claim 1 wherein said hydrocarbon is ethanol.

7. The invention as described in claim 1 wherein said hydrocarbon is diesel fuel.

8. The invention as described in claim 1 wherein said feedstock is a mixture of liquid water and liquid hydrocarbon.

9. The invention as described in claim 1 wherein said feedstock is liquid water.

10. The invention as described in claim 1 wherein said feedstock is liquid hydrocarbon.

11. The invention as described in claim 1 wherein said cooling means comprises a close-looped cooling system with a liquid coolant.

12. The invention as described in claim 1 wherein said cooling means comprises a heat pipe device which removes the waste heat from the fuel cell stack and transfers it to said feedstock through two-phase heat transfer mechanism.

* * * * *